United States Patent [19]
Upchurch

[11] Patent Number: 5,271,974
[45] Date of Patent: Dec. 21, 1993

[54] IMPROVED CEMENT AND POLYOLEFIN LINED PRODUCT

[75] Inventor: Thurman H. Upchurch, Lynchburg, Va.

[73] Assignee: AMSTED Industries Incorporated, Chicago, Ill.

[21] Appl. No.: 688,839

[22] Filed: Apr. 22, 1991

Related U.S. Application Data

[62] Division of Ser. No. 516,358, Apr. 30, 1990, Pat. No. 5,037,600.

[51] Int. Cl.$^5$ ............................................. F16L 9/133
[52] U.S. Cl. .............................. 428/34.4; 428/36.91; 428/35.9; 428/35.8; 428/703; 428/327; 428/329; 428/34.7; 138/140; 138/141; 138/146; 138/175; 138/DIG. 7
[58] Field of Search ................. 428/34.7, 36.91, 425.5, 428/425.8, 461, 689, 327, 339, 703, 34.4, 35.8, 35.9; 138/140, 141, 146, 175, DIG. 7

[56] References Cited

U.S. PATENT DOCUMENTS

| | | | |
|---|---|---|---|
| 2,816,323 | 12/1957 | Munger | 18/59 |
| 3,682,676 | 8/1972 | Karrh et al. | 138/146 |
| 3,861,944 | 1/1975 | Steinberg et al. | 138/146 |
| 4,319,610 | 3/1982 | Eckner | 138/146 |
| 4,670,315 | 6/1987 | Hillemeier et al. | 428/36 |

Primary Examiner—Ellis P. Robinson
Assistant Examiner—Charles R. Nold
Attorney, Agent, or Firm—Edward J. Brosius; F. S. Gregorczyk

[57] ABSTRACT

Iron pipe and other hollow articles are lined with a cementitious mortar containing a quantity of polymer particles and the pipe is rotated about its axis so as to stratify the mortar and develop a polymer rich inner surface that is subsequently cured, dried and heated to the polymer fusion temperature and then coated with a continuous layer of pure polymer.

18 Claims, 1 Drawing Sheet

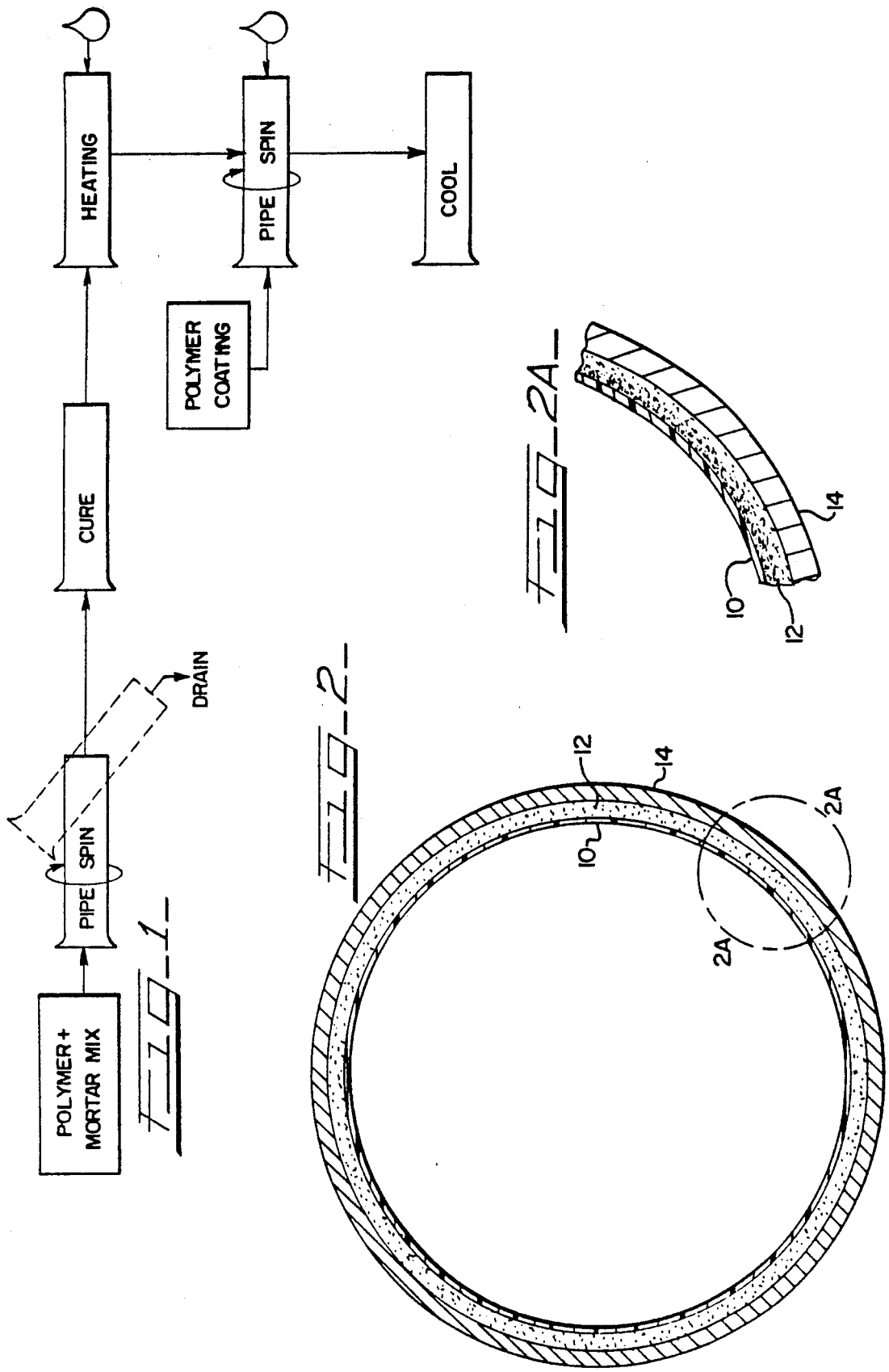

IMPROVED CEMENT AND POLYOLEFIN LINED PRODUCT

This is a division of application Ser. No. 07/516,358 filed on Apr. 30, 1990 now Pat. No. 5,037,600.

BACKGROUND OF THE INVENTION

This invention relates to the application of a continuous impervious polymer coating to a cementitious wall and more particularly is directed to a method of applying a polyethylene coating to the interior of a hollow article especially a cylindrical body such as cement pipe and cement lined iron pipe and to the coated pipe resulting therefrom.

It is known that plastic coatings, including coatings of polyethylene and other olefin polymer or copolymer materials, provide reduced friction coefficients and protection against corrosion and or erosion when applied to metal and or cement surfaces. This applies particularly to pipes made of metal or cement which heretofore have benefited from protective internal coatings of bitumen or coaltar epoxy as shown in U.S. Pat. No. 4,474,134, the disclosure of which is included herein by reference, to resist the destructive properties of liquids such as potable water, sewage or other substances transported therethrough. Indeed some ferrous pipes utilize an interior layer of cement as a protective coating to resist corrosion. Apparatus for producing cement lined pipe and other vessels is shown in U.S. Pat. Nos. 4,414,918; 3,563,791 and 2,598,972. the details of which are included herein by reference.

While the advantages of a plastic interior pipe coating have been known, the application of materials such as polyolefins has required expensive surface preparation and even so the coating tends to delaminate from the pipe surface. Prior techniques for applying polyolefins such as polyethylene to the interior surface of pipe are described in U.S. Pat. Nos. 3,348,995; 4,007,298; 4,254,165 and 4,407,893, the details of each are also incorporated herein by reference. While the following description deals largely with polyethylene, it is to be understood that other known thermo plastic coating material having desirable coating characteristics, such as polyurethane and polyvinylchloride may also be suitable provided they are chemically stable, compatible with the ingredients of cement and otherwise suitable for rotational molding techniques.

SUMMARY OF THE INVENTION

Accordingly, it is a principal object of the present invention to provide an improved method for surface bonding a coating of plastic material and the article produced thereby.

Another object of the present invention is to provide an improved method of rotationaly molding an inner lining of continuous plastic material onto a hollow body and the article produced thereby.

It is still another object of the present invention to provide an improved cylindrical body such as pipe with a continuous coating of polyethylene bonded to the surface thereof.

Briefly stated the present invention involves bonding of a polymer material to a cementitious wall or lining having an internal layer and surface that is enriched with a polymer substance. Preferably the cementitious wall is stratified with a cement rich layer to one side and a polymer rich layer at an opposite side and the latter is allowed to cure and then heated to drive off moisture before the polymer material is applied to the heated surface. The subject process may be practiced utilizing known apparatus to produce lined metal pipe, such as cement lined cast iron pipe; and is also applicable to the production of cement pipe and other products.

BRIEF DESCRIPTION OF THE DRAWINGS

Further objects and advantages will become apparent upon reading the following detailed description of a preferred embodiment in conjunction with the drawings wherein:

FIG. 1 is a flow diagram for the process of the present invention as applied to cast iron pipe;

FIG. 2 is a cross sectional view of a coated cast iron pipe of the present invention; and FIG. 2A is an enlarged detail of a portion of FIG. 2.

DETAILED DESCRIPTION OF THE INVENTION

According to the present invention a polymer is mixed with a cementitious mortar which is stratified and cured to produce a substrate having a polymer rich surface to which a substantially pure polymer coating may be fusion bonded. The technique is especially adaptable to the production of lined hollow products such as ferrous pipe, however, it will be readily understood that the technique hereafter described in detail is also applicable to the production of other lined pipes and to cement pipe as well as to tanks, storage vessels and other products. In the present description the terms polymer and polyethylene shall be understood particularly to include all densities of polyethylene and other olefin polymers or copolymers and combinations thereof, as well as other thermoplastics that are suitable for rotational molding, although high density polyethylene having a specific gravity of 0.91–0.97, e.g. 0.94, is preferred. Similarly the term cementitious shall be understood to include material having the properties of cement, which may comprise a kiln fired mixture of alumina, silica, lime, iron oxide and magnesia and may also include other materials including fillers such as sand.

The present method, as diagramed in FIG. 1, involves the admixing of a minor amount ranging between about 1–23 percent by weight of a polymer into a cementitious mortar comprising cement, liquid (usually water) and filler (usually sand) to produce a batter that is sufficiently fluid to permit the mixture to be partially stratify between heavier and lighter components and thereby produce a substrate surface that is rich with imbedded polymer. The polymer is preferably introduced as solid particles ranging between minus 10 to plus 325 mesh. The step of stratifying may be accomplished by natural settling of the heavier components and may be facilitated by agitation, or in a preferred embodiment stratifying is achieved by applying centrifugal forces on the mixture by rotating a hollow product being lined with the mortar.

Prior to the application of a continuous polymer coating the forming of a cementitious substrate is followed by curing, to develop available strength and hardness characteristics, and drying to remove moisture from at least the polymer rich strata. Preferably drying is accomplished by heating the cementitious substrate to the polymer fusion temperature; and drying is immediately followed by applying a quantity of substantially pure polymer to the hot polymer rich surface to thereby obtain a tenacious bond between the imbedded and coating polymers.

Preferably both imbedded and coating polymers are of the same composition and the bond will be essentially a merging of like materials. However, different polymers will also firmly meld together.

The coated product is then cooled and inventoried for distribution.

The aforedescribed coating method was devised primarily for the manufacture of internally coated cement lined cast iron pipe which may range in nominal size from about 3 inch to 108 inch diameter and lengths of about twenty feet, which is the best mode known for practicing the invention. However, it will be apparent that the invention may be readily adapted to the manufacture of pipe made of other materials, including steel, other metal, cement or concrete and other products such as tanks, storage vessels and the like.

The production of polyethylene coated iron pipe by the aforedescribed process is particularly advantageous because it is otherwise difficult to reliably bond polyethylene to an iron surface. A characteristic of polyethylene is that it does not bond well to other materials. Heretofore the surface of iron pipe has been carefully prepared by abrading and cleaning to create a rough surface to which polyethylene may adhere. However, according to the present invention, as illustrated in FIGS. 2 and 2A, a continuous coating layer 10 of polyethylene coheres to polyethylene in the cementitious lining 12 and the latter is bonded to the iron pipe 14 by a well understood reaction between hydroxide in the cement and iron on the pipe surface. The cohesive bond between the polyethylene and cementitious layer is superior to any available polyethylene adhesion directly to metal.

The manufacture of cement lined cast iron pipe is a well developed industry and techniques and apparatus are well known for applying a cementitious mortar and spinning the pipe to form a uniform internally concentric wall or lining. (See for example U.S. Pat. No. 4,474,134). Fundamentally a twenty foot standard length of pipe of virtually any production diameter is rotated horizontally relative to an internal distribution apparatus which applies a mortar, Pumped through a conduit connecting a mortar supply to the distributor, to the interior surface of the pipe. The pipe is also rotated about its longitudinal axis during and/or after application of the mortar to spread the mortar evenly into pipe surface irregularities and to release air bubbles so as to develop a cylindrical wall with a relatively uniform inner surface. The pipe is then stored for a period of time to enable the cement lining to cure. In most instances such cement lined pipe has been given an internal coating of bitumen, or the like, which adheres to the cement surface. Prior attempts to apply a polymer coating to such cement lined pipe have resulted in unacceptable delamination.

According to the present invention an internal polymer coating is bonded to the cement surface by first incorporating and imbedding a polymer composition in the cement wall or lining, which composition is selected to be bondable with the coating polymer. By bondable it is meant that the coating and imbedded polymers will meld rather than merely adhere. Thus it is preferred to utilize substantially the same polymer composition in both the mortar mix and the coating.

The bonding is enhanced by causing the cementitious interface to be relatively rich with imbedded polymer. That is accomplished by preparing a mixture of cementitious mortar and a lesser amount of polymer, preferably about 5-12 percent by weight of high density polyethylene in fine, 35-50 mesh, particle form. The mixture or batter may include a small excess of liquid, usually water so as to facilitate subsequent stratification of the cementitious internal pipe wall. However, it is preferred to adjust the batter composition to obtain sufficient fluidity with no or minimal excess liquid so as to avoid loss of polymer when draining excess liquid from the lined pipe. The process continues by depositing the mixture on the interior surface of a pipe length or other form, as by pumping the mixture to a longitudinally movable applicator and extruding or slinging the mixture onto the pipe surface; and then stratifying the mixture, in place, so as to bring to the unconfined surface a preponderance of the admixed polymer. This is accomplished in pipe manufacture by spinning the pipe about its longitudinal axis at a rotational speed, and for a period of time, sufficient to cause the heavier cement and filler components to migrate and concentrate outwardly by centrifugal force thus leaving an internal strata that will be progressively richer in polymer toward the internal surface. However, the spinning should not be conducted under conditions to cause complete stratification as it is desired to have a cementitious wall with radially interlocked continuums of cement and of polymer so as to obtain strength and hardness as well as roots to polymer bonding sites. Normally spinning for a period of about one to two minutes at a rotational speed selected to develop a force of between five and one hundred fifty gravities (5-150 G) will be sufficient. However, greater forces of up to about 1,300 G may be utilized depending on the fluidity of the mixture.

Spinning may be followed by removing any excess free liquid that may be expelled from the batter mixture. This may be accomplished by tilting the pipe and draining the free liquid from the lower end.

Curing of the cementitious wall or lining is then obtained by storing the pipe, usually for a number of days, until the cement becomes hard and strong. Thereafter a separate step of drying is conducted to rid the cementitious lining of uncombined moisture that is entrapped in its slightly porous structure. Such drying is conveniently accomplished by heating and increasing the temperature of the pipe and/or the cementitious inner wall; and such heating is continued until the inner surface reaches its polymer fusion temperature in the range of about 350°-600° F. Immediately thereafter the pipe interior is coated by applying a second quantity of pure polymer, preferably the same composition mixed with the mortar, e.g. polyethylene, to the hot cementitious wall surface. This step may also advantageously utilize centrifugal forces by again spinning the pipe about its longitudinal axis while uniformly introducing polymer particles along the pipe length. The second quantity of polymer is in an amount calculated to produce the desired coating thickness, e.g. 8 to 60 mil., throughout the pipe length. Thereafter the coating step is followed by cooling and the finished pipe is then shipped or inventoried for future use.

EXAMPLE I

A test was conducted on 10 inch dia. 18 foot length of cast iron pipe by applying a mortar mix comprising (by weight) 41.3% silica sand, 33.8% LEHIGH brand Portland cement; 6.0% PLEXAR 232 brand Polyethylene (35 mesh particles having 0.94 sp.gr. supplied by Quantum Chemical Corp.), and 18.9% water. Volumewise the polyethylene comprised about 15% of the mortar mix. The pipe with mortar mix was spun for two minutes attaining a top speed of 1080 r.p.m. (producing a force of about 150 G.) and then allowed to cure for one week. Thereafter the pipe was oven heated to 550° F. and 5 pounds of the same polyethylene composition was rotationaly cast onto the hot internal surface to produce a coating 20 mil. thick. The resultant coating was firmly bonded, smooth and free of voids or holidays.

EXAMPLE II

A satisfactorily lined and coated cast ductile iron pipe of 10 inch inside diameter was prepared with a mortar mix comprising (by weight) 38.1% sand, 31.1 cement, 19.7% water and 11.1% polyethylene powder. Volume wise the polyethylene comprised about 25% of this mortar mix. The pipe was spun, cured and coated as in Example I. Similarly the resultant coating was firmly bonded, smooth and free of voids or holidays.

EXAMPLE III

Another 10 inch diameter pipe was lined and coated by first applying a mortar mix comprising (by weight) 36.4% sand 32.5% cement, 23.1% water and 8.0% polyethylene powder. The pipe was spun, cured and coated as in Example 1 with similar results.

Further variations and modifications may be made in the process and product without departing from the spirit and scope of the invention which is defined in the following claims.

What is claimed is:

1. An improved cylindrical body having an internal cementitious coating with a continuous internal coating of polymer, said cylindrical body comprising:
   a first cylindrical cementitious coating having, a first outer gradient comprising substantially cement and a second outer gradient forming a cylindrical inner surface of mixed cement and first polymer substances imbedded therein with said first polymer substances in greater concentration near the inner surface of said second outer gradient; and
   a second cylindrical continuous coating comprising substantially a second polymer material applied to said cylindrical inner surface and bonded directly to said first imbedded polymer substances of said second outer gradient.

2. The product of claim 1, wherein said first and said second polymer are the same composition.

3. The product of claim 1, wherein said second polymer is a polyethylene.

4. The product of claim 1, wherein said second cylindrical continuous coating is heat bonded to said cylindrical inner surface of said second outer gradient.

5. The product of claim 1, wherein said cementitious coating is formed from a mortar mixture containing a filler, cement, water and a powdered polymer.

6. The product of claim 5, wherein said powdered polymer is present in an amount of about 1-23% by weight of said mortar mixture.

7. The product of claim 1, wherein said cementitious wall is formed from a mortar mixture containing sand, cement, water and a polyethylene.

8. The product of claim 7, wherein said polyethylene is present in an amount of about 1-23% by weight of said mortar mixture.

9. An improved ferrous pipe having an internal coating of polymer, said pipe comprising:
   a cylindrical shell;
   a first cementitious coating having a first outer gradient comprising substantially cement adjacent said shell and a second outer gradient forming a cylindrical inner surface of mixed cement and imbedded first polymer substances, with said first polymer substances in greater concentration near the inner surface of said second outer gradient; and
   a second continuous inner coating comprising substantially a second polymer material applied to said cylindrical inner surface and bonded directly to said imbedded first polymer substances of said cylindrical inner surface.

10. The product of claim 9, wherein said first and said second polymer substances are the same composition.

11. The product of claim 9, wherein said second polymer is a polyethylene.

12. The product of claim 9, wherein said continuous inner coating is heat bonded to said second layer.

13. The product of claim 9, wherein said cementitious coating is formed from a mortar mixture containing a filler, cement, water and a powdered polymer.

14. The product of claim 13, wherein said powdered polymer is present in an amount of about 1-23% by weight of said mortar mixture.

15. The product of claim 9, wherein said cementitious coating is formed from a mortar mixture containing sand, cement, water and a polyethylene.

16. The product of claim 15, wherein said polyethylene is present in an amount of about 1-23% by weight of said mortar mixture.

17. An improved ferrous pipe comprising
   a cylindrical ferrous shell having an inner surface, a cementitious inner coating formed on the inner surface of said cylindrical ferrous shell, said cementitious inner coating comprising a gradient of polymer enriched cement wherein said polymer increases in concentration in a radial direction inwardly from said cylindrical ferrous shell, said cementitious inner coating forming an inner cylindrical layer,
   and a second polymer material forming an inside coating on said inner cylindrical layer.

18. The improved ferrous pipe of claim 17
   wherein said second polymer material forming said inside coating is bonded to said polymer in said cementitious inner coating.

* * * * *